United States Patent [19]

Kim

[11] Patent Number: 4,934,632
[45] Date of Patent: Jun. 19, 1990

[54] AEROTHERMAL ULTRA HYPERSONIC AIRCRAFT

[75] Inventor: Kyusik Kim, 5026 Rhoads Ave., Santa Barbara, Calif. 93111

[73] Assignee: Kyusik Kim, Santa Barbara, Calif.

[21] Appl. No.: 128,058

[22] Filed: Dec. 3, 1987

[51] Int. Cl.[5] .................... B64B 1/24; B64D 27/00; B64C 15/00; F02K 3/00
[52] U.S. Cl. .................... 244/53 R; 244/62; 244/12.1; 60/270.1; 60/244
[58] Field of Search .......... 244/53 R, 53 B, 12.1, 244/73 R, 74, 62; 60/270.1, 244, 246

[56] References Cited

U.S. PATENT DOCUMENTS

| | | | |
|---|---|---|---|
| 2,335,005 | 11/1943 | Gieskieng et al. | 60/244 |
| 2,553,443 | 5/1951 | Davis | 60/270.1 |
| 3,017,140 | 1/1962 | Barnard | 60/270.1 |
| 4,500,052 | 2/1985 | Kim | 244/53 R |
| 4,667,900 | 5/1987 | Kim | 244/12.1 |

Primary Examiner—Joseph F. Peters, Jr.
Assistant Examiner—James M. Kannofsky

[57] ABSTRACT

An aircraft converting aerodynamic compression ram thermal stream energy into thrust power generation comprising:

(a) an aerodynamic compression ram thermal stream generating multiple vane diffuser as the air-inlet to a pressure plenum;
(b) a ram thermal-pressure stream induction double throttle duct consisting of a main ramflow inducing nozzle and a fuel injection ramflow inducing nozzle wihch coalesce to form the air-oulet of a pressure plenum-engine pod;
(c) a compressed air shooting annular slotted ignition chamber downstream of the fuel injecting ramflow inducing nozzle with flame bed-walled combustion chamber forming a ramjet engine;
(d) a ram thermal-pressure stream induction annular slotted thrust nozzle extending rearward from the combustion chamber of the ramjets and exit nozzle of a turbojet engine thereby creating a tailpipe for the turbo-ram induction jet engine; and
(e) an aerodynamic compression ram thermal stream sink double-walled shockcone airframe, the double walled shockcone housing the ram thermal stream spaces communicating with the ram thermal-pressure flow induction thrust generating channel.

4 Claims, 5 Drawing Sheets

AEROTHERMAL ULTRA HYPERSONIC AIRCRAFT

BACKGROUND OF THE INVENTION

1. Field of the Invention

An aerothermal ultra hypersonic aircraft is disclosed having aerodynamic compression heating on the forward section of an airfoil-shaped disk airframe comprising an aerodynamic compression ram thermal flow generating vane diffuser fitted at the forward air-inlet of an air plenum-engine pod, and the ram thermal-pressure flow induction nozzles mounted in the rearward portion at the air-outlet of the air plenum-engine pod. The air-flow induction nozzles peripherally terminate to an oval exit nozzle, where the engine pod peripherally terminates to an annular slot along the oval exit nozzle extending from the ram thermal constriction-pressure plenums.

The aircraft utilizes an aerodynamic compression ram thermal stream generating vane diffuser consisting of vertical multiple fixed vanes and deflectable vanes, both vanes having a leading section and a trailing section. A ram thermal porous shock-wedge forms the forward-leading section of each vane. The shock-wedge is peripherally sunk into a thermal well and extends with curvature out to bilateral thermal lips on both sides of the leading section, then converges to the peripheral edges of each vane.

The term "fixed vane" means a straight single piece of vane rigidly fixed to the diffuser frame positioned adjacent the center-line portion of ram thermal constriction air plenums located inside the engine pod and on both sides of the turbojet engine.

The term "deflectable vane" means a vane consisting of two sections: a leading section rigidly joined to the diffuser frame and a drivable trailing section operative pivotally with the diffuser frame and operatively hinged with the leading section of each vane.

The deflectable vanes are positioned in an equally spaced relationship in the diffuser frame on both sides of the fixed to vanes. The trailing section of vanes are operatively coupled to an actuator for adjusting the vane deflect angles towards the fixed vanes.

During high speed operation, the activated ceramic ram thermal pores of the shock-wedge with the thermal well leading vanes generates ram compressed thermal air which then combines with an aerodynamic compression shock wave on the vane diffuser, generating a compressed ram thermal stream. The compressed ram thermal stream flows through the leading section of the vanes, the flow paths being deflected by the trailing section of deflectable vanes producing the oblique ram thermal streams flowing towards tangential constriction into the front of the ram thermal stream induction nozzles.

The ram thermal stream induction nozzle consists of a convergent-divergent double throttle duct in which the center throttle is the main ramflow inducing nozzle and the outer throttle is the fuel injecting ramflow inducing nozzle. Both nozzles extend from a bellmouth-shaped air inlet located within the ram constriction-pressure plenums. The bellmouth air inlet of the fuel injecting ramflow inducing nozzles encloses the compressed air chamber communicating with a compressed air shooting slot with liquid fuel injection sprayers and ignitors which are located in front of the combustion chamber and adjacent to the throat of the fuel injecting ramflow inducing nozzle. The spreading compressed air intercepts the injected liquid fuel and is processed as a combustible mixture with ignition producing a primary flame stream in the ignition-combustion chamber of the ramjet.

The throat downstream of a main ramflow inducing nozzle extends, slightly diverges, and terminates in an intermediate wall of the ignition-combustion chamber. The throat downstream of the fuel injecting ramflow inducing nozzle is divergent to ensure an adequate ignition air velocity in the combustion chamber. Activated ceramic lined combustion chamber walls function as a flame bed and surrounds vaporized gas orifices and the liquid fuel vaporization chamber with fuel sprayers. The processing of the vaporized gas-air mixture on the flame bed produces a secondary flame stream in the combustion chamber of the ramjet.

The combustion chamber wall comprises a liquid fuel vaporization chamber on the outer skin of the combustion chamber near the throat downstream of the fuel injecting ramflow inducing nozzle. The flame bed of the combustion chamber wall functions as a flame wrapping of the high velocity ramstream to achieve the high velocity combustion at the ramjet. In this context, flame wrapping means the entrainment of an airstream by an envelope of flame wherein the flame resides on the chamber walls.

The inner edge downstream ends of the combustion chamber walls tangentially join with the exit of the turbojet engine and the outer edges of the combustion chamber walls extend to the oval thrust nozzle terminating with a ram thermal stream inducing annular slot which communicate with the ram thermal constriction pressure plenums. Downstream of the ramjets, the exit stream tangentially interacts with the turbojet stream through the turbo-ram induction jet oval thrust nozzle generating the aerodynamic thermal ram-turbo induction jet thrust stream flowing over the vacuum lift-thrust generating wing in the jet thrust peripheral flow recycling induction aerodynamic generating channel.

The forward section of the airframe comprises an aerodynamic compression heat sink shockcone enclosing slots with perforated heat tile-lined outer wall and an insulated inner wall, the space between inner-outer double walls defining a ram thermal stream space. The ram thermal stream space extends to the aerodynamic lift-thrust generating channel permitting the ram thermal stream to flow directly into the thrust generating channel.

The ram thermal constriction plenum is the high pressure side of the aerodynamic thermal induction jet engine having the same pressure and volume as the ram thermal stream which is a function of the aerodynamic compression heating relative to the speed and other operating parameters of the flight.

The aerodynamic compression ram thermal stream used according to this invention, contributes to the thrust power generation thereby reducing fuel consumption and making use of nondepletable energy source which is an intense high temperature on the forward section of an ultra hypersonic aircraft.

2. Description of the Prior Art

The use of the variable pitch vane diffuser, variable pitch cone diffuser, and the travelling vanes, ramp, or flap dampers are noted in the art. Typically the diffusers control the volume of the airstream passing through the power plant. Also, the prior art two-way dampers are oriented in horizontal and vertical positions for the engine suction pressure conversion to generate the suck lift force during short run take-off or landing associated with the opening of the upper direction of the dampers instead of the horizontal air intake dampers. Also the tail pipes having round exit nozzles adapted to be affixed to the exit nozzle of conventional turbojet engine are known in the art.

SUMMARY OF THE PRESENT INVENTION

The present invention relates to a new and novel aerothermal ultra hypersonic aircraft. The forward section of the disk-airframe consists of:
 (a) an aerodynamic compression ram thermal stream generating vane diffuser fitted on the front face of the engine pod at the air inlet of the power plant;
 (b) a plurality of ram thermal pressure stream induction nozzles mounted on the rearward portion of the engine pod at the thrust stream outlet of the power plant; and
 (c) an aerodynamic compression ram thermal stream sink double-walled shockcone housing the ram thermal stream spaces communicating with the ram thermal-pressure flow induction thrust generating channel.

The aerodynamic ram thermal stream generating vane diffuser is an array of vertical multiple vanes some of which are fixed vanes and other being deflectable vanes, each vane having a leading section and trailing section. An activated porous ceramic lined shock-wedge forms the forward aspect of the leading section of the vanes and the shock-wedge is peripherally sunk into the thermal well on both sides of the leading section of the vanes. The thermal well extends with curvature out to the outer edge of the thermal lips where it converges to form the peripheral edge of the vanes.

A fixed vane is a single piece. The leading-trailing section is rigidly jointed with the diffuser frame and positioned adjacent the center-line portion of the ram constriction plenums in the engine pod space on both sides of the turbojet engine.

Each deflectable vane has two parts: (a) a rigid leading section; and (b) an operative trailing section. The deflectable vanes are fitted in an equally spaced relationship in the diffuser frame on both sides of the fixed vanes.

The peripheral edge of the leading section of a deflectable vane comprises a concave shaped groove which mates with the convex shaped forward edge of trailing section of the deflectable vane. Both sections of the vanes are operatively jointed and linked to an actuator for adjusting the angles of deflection of the trailing sections with respect to the fixed vanes, such that when the aircraft is in high speed flight, the porous shock wedge and thermal well generates a thermal stream that spills over the thermal lips and combines with the aerodynamic critical compression shock creating a ram-thermal stream.

The ram thermal stream flow through the deflectable vanes produces oblique ram-streams which are deflected inwards to each fixed vane and tangentially constricted such that the ramstream shaping actions are convergent to a critical pressure forming freestream throats then diverge so that flow into the low velocity air plenums. The shaping action of the oblique ram-stream constriction reduces ram drag on the engine suction diffuser and increases ram pressure inside the low velocity air plenums in front of the ram thermal stream induction nozzles.

The ram thermal stream induction nozzle consists of the convergent-divergent double throttle duct whose center throttle is the main ramflow inducing nozzle and the outer throttle being the fuel injecting ramflow inducing nozzle, both throttles being convergent from the bellmouth-shaped air inlets located within the ram constriction-pressure plenums on both sides of a turbojet engine within the engine pod.

The bellmouth air inlet of the fuel injecting ramflow inducing nozzle comprises a compressed air chamber communicating with a compressed air shooting annular slot and liquid fuel injecting sprayers with ignitors. The compressed air shooting annular slot is located at the front and center portion of the ignition-combustion chamber adjacent to the throat of the fuel injecting ramflow inducing nozzle.

The throat downstream of the main ramflow inducing nozzle diverges slightly along it extension and terminates in an intermediate wall of the ignition-combustion chamber. The throat downstream of the fuel injecting ramflow inducing nozzle is divergent to ensure an adequate ignition air velocity of the flame stream within the ignition-combustion chamber.

The double wall ignition-combustion chamber of the fuel injecting ramflow inducing nozzle is also the liquid fuel prevaporization chamber located between inner and outer walls An activated ceramic lined inner wall encloses vaporized gas orifices and forms the flame bed of the combustion chamber. The vaporized gas orifices are inclined towards the exit of the thrust stream which forms a slip-flow of the airstream over the orifices in the combustion chambers.

The downstream end inner edges of the combustion chamber walls are tangentially joined with the exit nozzle of a turbojet engine and outer edges of the combustion chamber walls are peripherally extended to terminate in an oval thrust nozzle with the ram thermal stream inducing annular slot extending from the ram thermal stream constriction-pressure plenums.

The production of the ramjet during low speed flight, comes from activating the liquid fuel injecting spray intercepts with a stream of the compressed air, then igniting the combustible mixture to produce a primary flame stream in the ignition-combustion chamber of the ramjet. The primary flame stream functions to heat-up the flame bed of the combustion chamber walls which induce the liquid fuel vaporization chamber, when activated, to turn on the liquid fuel and vaporized gas-air mixture on the flame bed to produce, in turn, a secondary flame stream in the combustion chamber. The flame stream on the flame bed functions as a flame wrapping boundary layer for the ramjet stream produced inside the ignition-combustion chamber. The flame wrapping boundary layer creates the thermal confinement of the combustion stream to insure that the high velocity ignition achieves a high velocity ramjet combustion. The ramjet streams tangentially interact with the turbojet stream at the ram-turbo induction jet oval thrust nozzle generating a flattened oval thrust stream, The heat input ramjet operation is limited by the speed and the other operating parameters of flight. Ramjet combustion is attained in low speed to hypersonic flight. The temperature of the aerodynamic ram thermal stream reaches the critical skin temperature of the thermal stream paths, thereby causing the steam injection to reduce the skin temperature of the ram thermal stream paths.

An aerodynamic compression heat sink shockcone forms the forward section of the airframe and consists of slots with a perforated heat tile lined double wall shockcone having a ram thermal stream space in between the inner and outer walls. The insulated inner wall of the shockcone provides a ram thermal stream hollow space and extends into the space behind the wall of the thrust generating channel. The channel walls enclose the ram thermal stream orifices. The ram thermal stream orifices are oriented downstream to form a slipflow of thrust stream. The ram thermal stream flows into and layers on the channel walls functioning as a thermal bounding boundary layer for lubricating the thrust stream in the thrust generating channel.

The flattened oval thrust stream flows over the vacuum lift-thrust generating wing in the jet thrust peripheral flow recycling induction aerodynamic generating channel which has VTOL capacity to ultra hypersonic flight of the aircraft.

BRIEF DESCRIPTION OF THE DRAWING

The foregoing and other advantages and features of this invention will become apparent from the following description of the preferred embodiment, when considered together with the illustrations and accompanying drawings which include the following Figures.

DESCRIPTION OF THE PREFERRED EMBODIMENT

An ultra hypersonic aircraft, during high speed flight, generates aerodynamic compression heating on the forward section of an airframe and aerodynamic expansion cooling on the rearward section of the disk-airframe.

The energy contained in an aerodynamically compressed and heated thermal stream can be transmuted into thrust power generation by means of an aerodynamic thermal generating ram constriction vane diffuser as the ram thermal stream inlet of the power plant and the ram thermal-pressure stream induction nozzles as the thrust stream outlet of the power plant.

Figure 1:
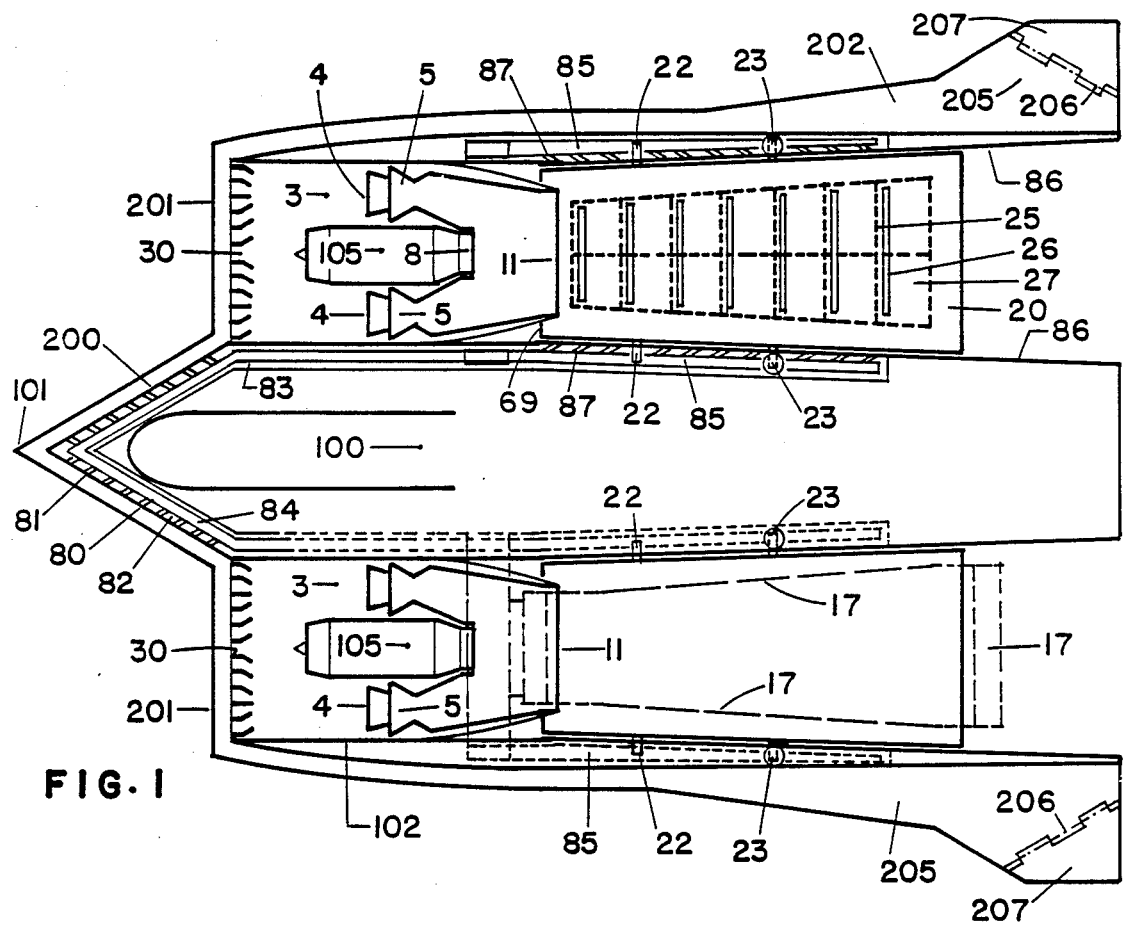
FIG. 1 is a plan view of an aerothermal ultra hypersonic aircraft showing payload space and power plants including aerodynamic lift-thrust generating channels.
Figure 2:
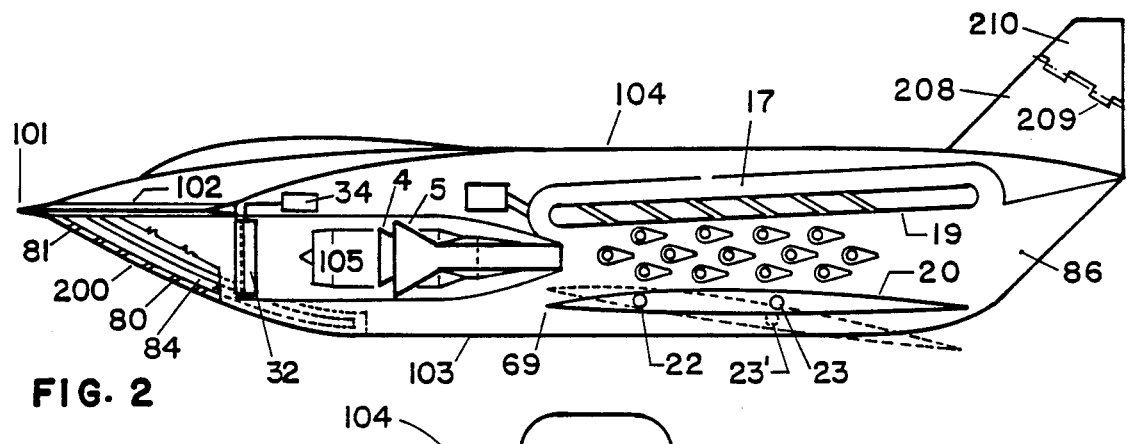
FIG. 2 is a longitudinal section view of an aerothermal ultra hypersonic aircraft showing the power plant including the aerodynamic lift-thrust generating channel.
Figure 5:
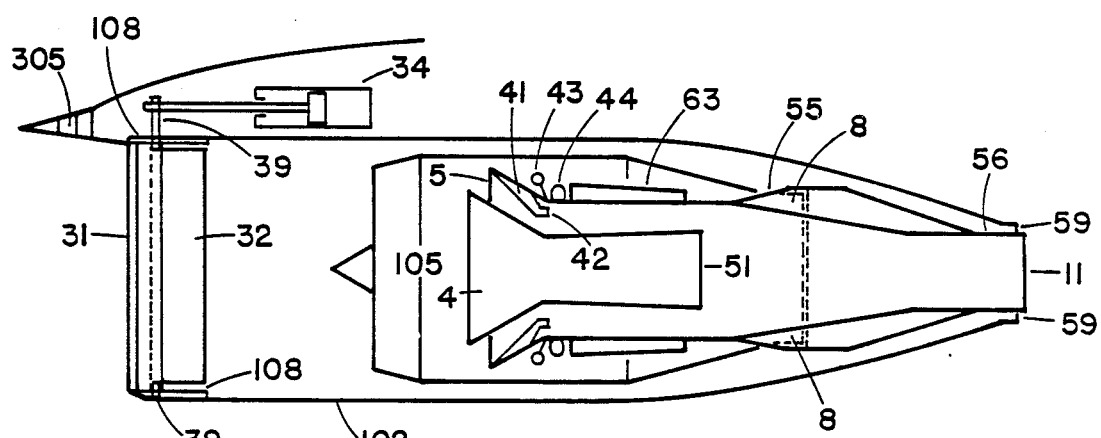
FIG. 5 is a longitudinal section view of an aerodynamic thermal ram-turbo induction jet engine.

The preferred embodiment of the aerothermal ultra hypersonic aircraft is illustrated in FIGS. 1, 2 and 5. The hypersonic disk-airframe functions as the envelope of cargo space 100 and housing of the aerodynamic power plant which produces lift-thrust forces.

The disk-airframe has a forward shockcone 200 and wedge shaped perimeter 201 and 202 throughout from forward to rearward. The wedge perimeter joins the lower airfoil disk 103 and the top airfoil disk 104. The wedge perimeter on the both sides of a disk-airframe peripherally extending to the horizontal fin 205, a hinge joint 206 provided at the elevator 207 located at the end portion of bilateral fins 205. Also the disk-airframe includes vertical fins 208 located behind both sides of the top airfoil and hinge joint 209 with rudders 210. The elevators 207 and rudders 210 are linked with actuators to control flight stability.

The disk-airframe utilize the stream generation on the forward section and the steam condensation on the rearward section includes an air breathing power plant and the aerodynamic lift-thrust generating channel.

The air breathing power plant has an air inlet opening comprising an aerodynamic thermal generating ram constriction vane diffuser 30 located at the front face of an engine pod 102 and has an air outlet opening which comprises a turbo-ram induction jet oval thrust nozzle 11 located at the rear of the engine pod and which includes the ram thermal inducing nozzles 4 and 5 located within the ram constriction air plenum-engine pod on both sides of the turbojet engine 105. The jet thrust nozzle 11 produces a turbo-ram induction jet oval thrust stream.

Figure 11:
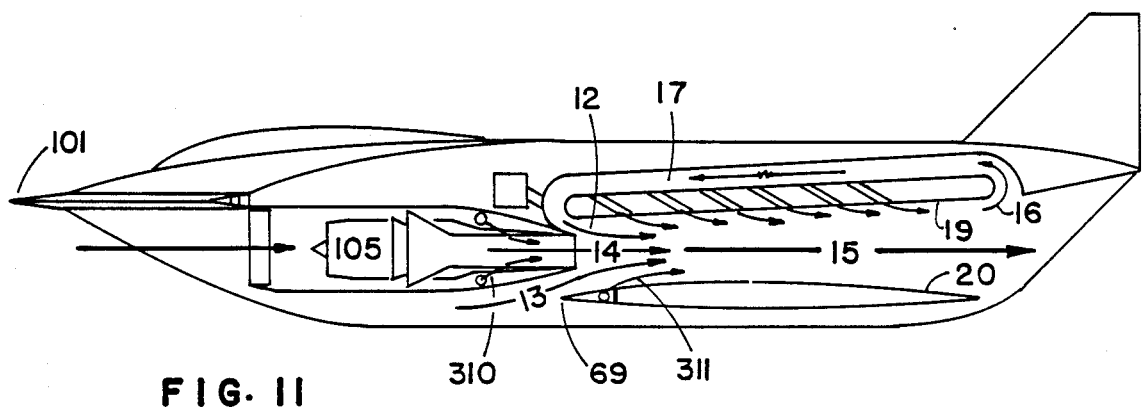
FIG. 11 is a longitudinal section view of an aircraft showing the aerodynamic thermal ram-turbo induction jet thrust stream flowing through the aerodynamic lift-thrust generating channel.

FIG. 11 shows the oval thrust stream 14 flowing through the aerodynamic generating channel with a portion of the jet thrust peripheral flow 16 being diverted into a reverse flow duct 17. The dynamic pressure of the spreading oval thrust stream 14 induces secondary airflows of a recycling airstream 12 and the surrounding airstream 13. The oval thrust stream 14 and the secondary air streams 12 and 13 tangentially interact creating a flattened jet thrust stream 15 which flows over the vacuum lift thrust generating wing 20 located in the diverging contour of the aerodynamic generating channel.

FIGS. 1 and 2 show the forward section of the airframe comprising a double wall shockcone 200 including slots 80 with perforated heat tile 81 lined outer wall 82, insulated inner wall 83 and hollow space 84 between double walls defining a ram thermal stream space. The hollow spaces 84 of the shockcone extend into the space 85 behind the channel walls 86. The channel wall has a plurality of inclined orifices 87 which direct the slipflow of the thrust stream toward the rear in the aerodynamic lift-thrust generating channel.

During high speed flight, the aerodynamically compressed and heated ram thermal stream sinks into the hollow space 84 through the slots 80 and perforated orifices 81.

Figure 10:
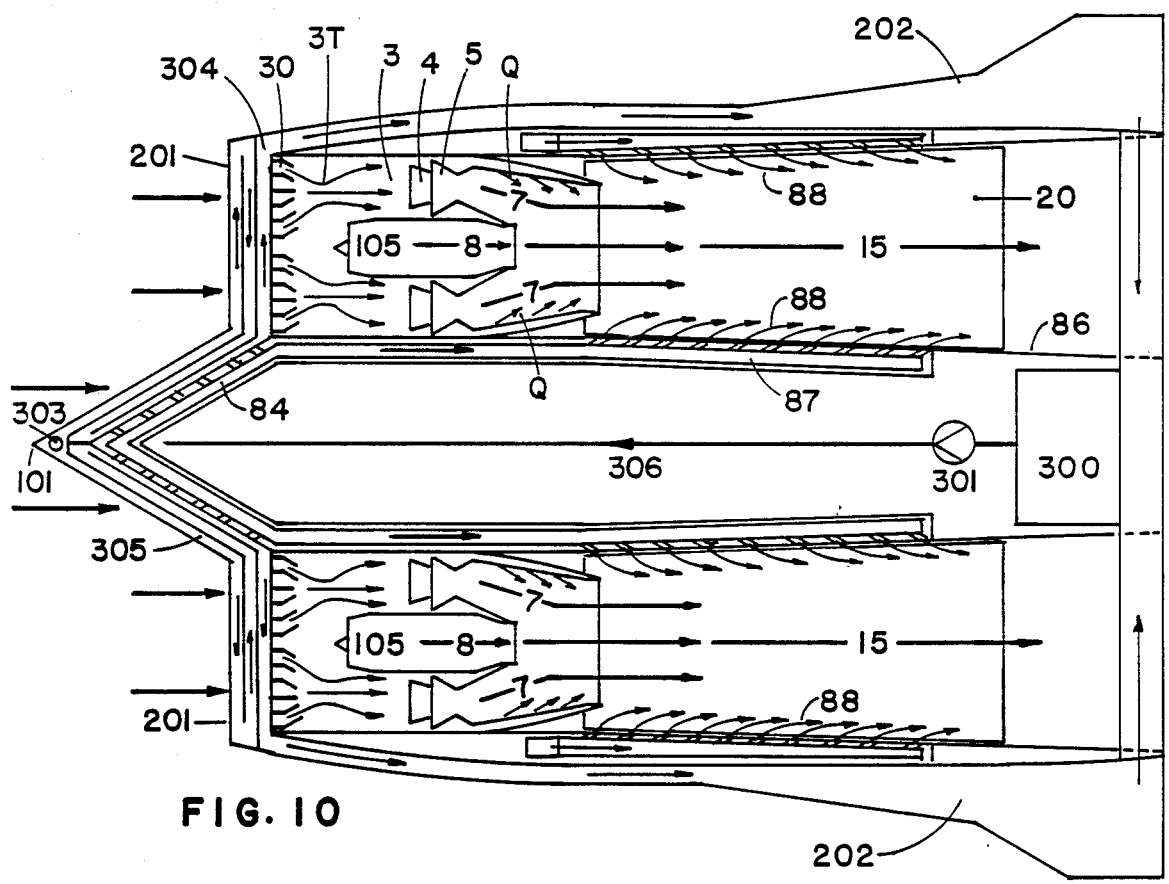
FIG. 10 is a plan view of the aerodynamic thermal ram-turbo induction jet power plants showing the schematic of ram thermal stream directly flowing into the aerodynamic lift-thrust generating channels.

FIG. 10 shows the ram thermal stream 88 flowing into the aerodynamic generating channel through the hollow spaces 84 and 85 and inclined orifices 87 on the channel walls 86. The ram thermal stream in the hollow spaces has a pressure and volume relationship what depends upon the speed of flight and the operating parameters. FIG. 10 shows the ram thermal stream 88 layer on the channel walls creating a thermal boundary layer of thrust stream 15 in the aerodynamic thrust generating channel which reduces frictional energy lost by the thrust stream and reduces the intense high temperature on the forward shockcone of the airframe.

Figure 4:
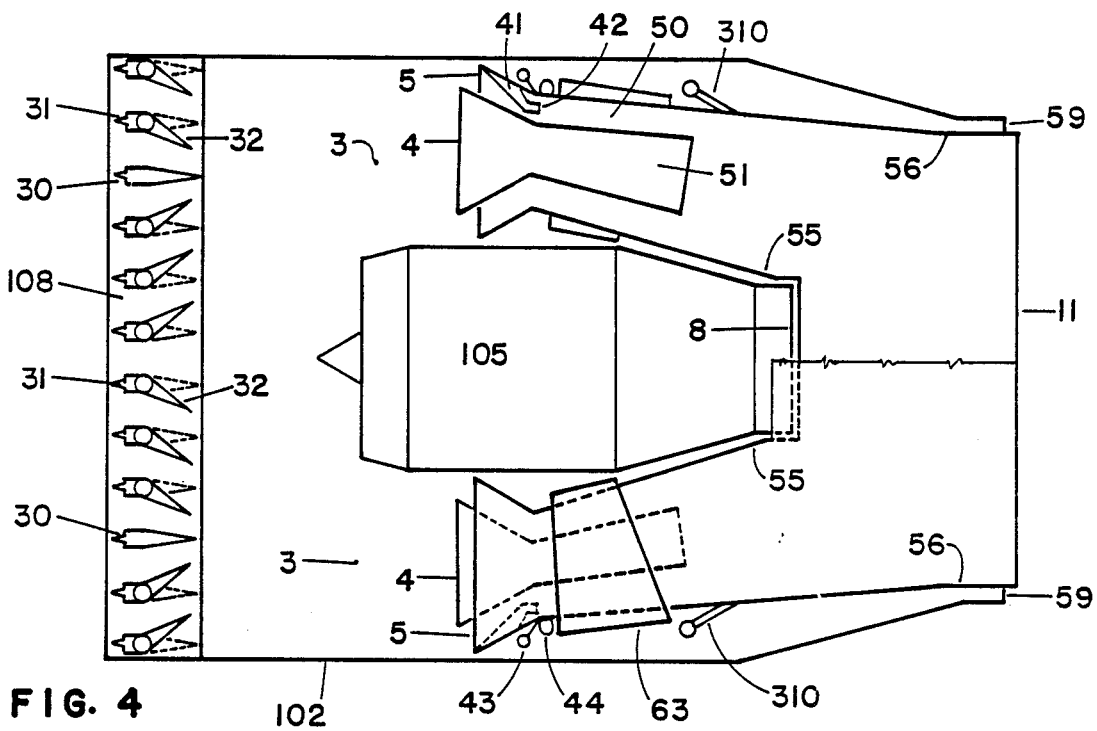
FIG. 4 is a plan view of an aerodynamic thermal ram-turbo induction jet engine showing the aerodynamic thermal generating ram constriction vane diffuser and the ram thermal inducing nozzles including a turbo-ram induction jet oval thrust nozzle.
Figure 6:
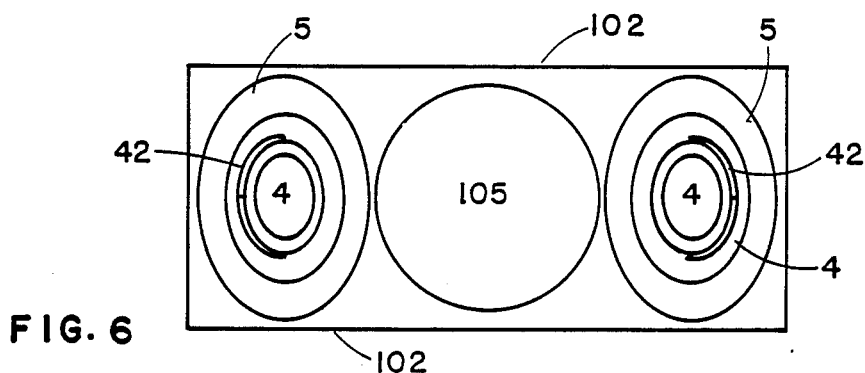
FIG. 6 is a cross sectional view at the throats of an aerodynamic thermal ram-turbo induction jet engine showing the ram thermal inducing nozzles.

FIGS. 4, 5 and 6 show the aerodynamic thermal ram-turbo induction jet engine enveloped by an air plenum-engine pod 102 that includes the aerodynamic thermal generating ram constriction vane diffuser 30 and 31 fitted on the forward section front face of the engine pod as an air-inlet of power plant. The oval thrust nozzle 11 including the ram thermal inducing nozzles 4 and 5 fitted on the rear section of the engine pod, as a thrust stream outlet of the power plant.

The turbojet engine 105 is located along the centerline portion of the engine pod 102, while the ram thermal inducing nozzles 4 and 5 are located within the ram pressure plenums 3 on both sides of a turbojet engine.

The ram constriction vane diffuser is an array of vertical multiple vanes including fixed vanes 30 and deflectable vanes 31, both vanes having a leading section and a trailing section.

The fixed vane 30 is a single piece of a straight vane rigidly joined to the diffuser frame 108 located near the center-line portion of the ram plenums 3 on both sides of the turbojet engine 105 within the engine pod 102.

The deflectable vane consists of two pieces of vane a rigidly fixed leading section 31, and a operative jointed trailing section 32. The deflectable vanes are equally spaced within the diffuser frame 108 on both sides of the fixed vanes 30. The trailing section of vanes 32 are linked with the actuators 34 to permit adjustment of the turning angles of the trailing section 32 to deflect towards the fixed vanes 30. The vanes are aligned with bilateral symmetry about the center line of a engine suction diffuser 105 so that the trailing section of vanes 32 adjacent to the engine suction diffuser turns away from the center-line of the engine suction diffuser to reduce the ram drag on the engine suction diffuser during high speed operation.

Figure 7:
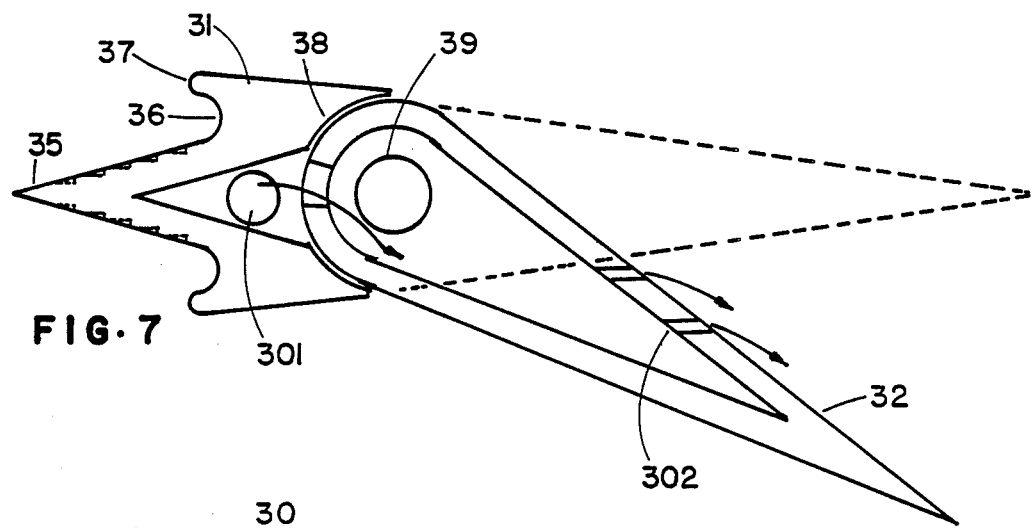
FIG. 7 is a detail of the deflectable vane for the aerodynamic thermal generating ram constriction vane diffuser.
Figure 8:
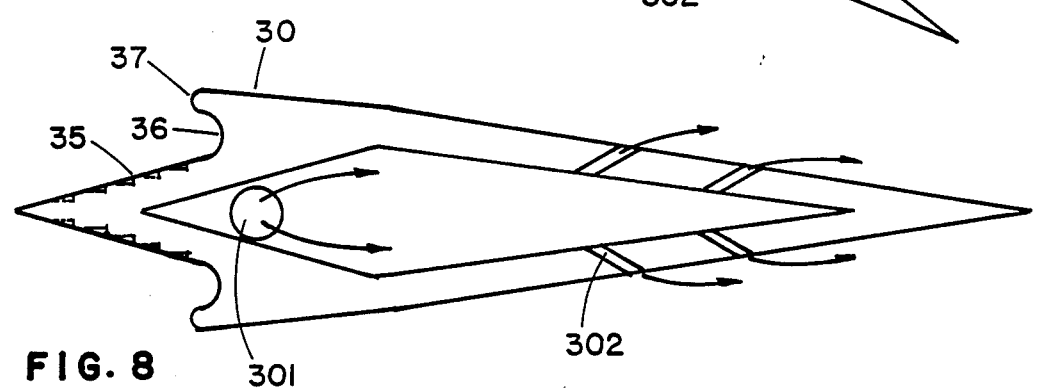
FIG. 8 is a detail of the fixed vane for the aerodynamic thermal generating ram constriction vane diffuser.

FIGS. 7 and 8 show the activated ceramic-lined shock-wedge 35 forming the forward section of vanes whose porous faced double wall of shock-wedge 35 is contoured to dip into the thermal well 36 then curve out to the thermal lips 37 on both sides of the vanes, finally converging to the trailing edge of the vanes.

The ceramic-lined double-wall vanes include vane hollow spaces within the vane fitted with steam ventilation and having a steam inlet 301 on the leading section of the vane hollow and steam outlet orifices 302 on the trailing section of the vane hollow to prevent the vane from reaching the high skin temperature of vane system.

The peripheral edge of the leading vane section 31 is shaped with the concave groove joint 38 mated to and in alignment with the forward convex edge of trailing vane 32. The forward of trailing vane 32 is mounted by means of an operative pivot 30 which enables the vane to swing within the concave groove of the leading vane 31. FIG. 5 shows a pivot 39 integral by sleeved within the diffuser frame 108 with the extended end of the pivot linked to the actuator 34 for adjusting the deflection angle of the trailing vanes 32. FIG. 4 shows the trailing vanes 32 are deflected towards to the fixed vanes 30. FIG. 10 shows the ram thermal streams are deflected so as to be concentrated on the front of the ram thermal inducing nozzles 4 and 5 of the aerodynamic thermal ram-turbo induction jet engine.

Figure 9:
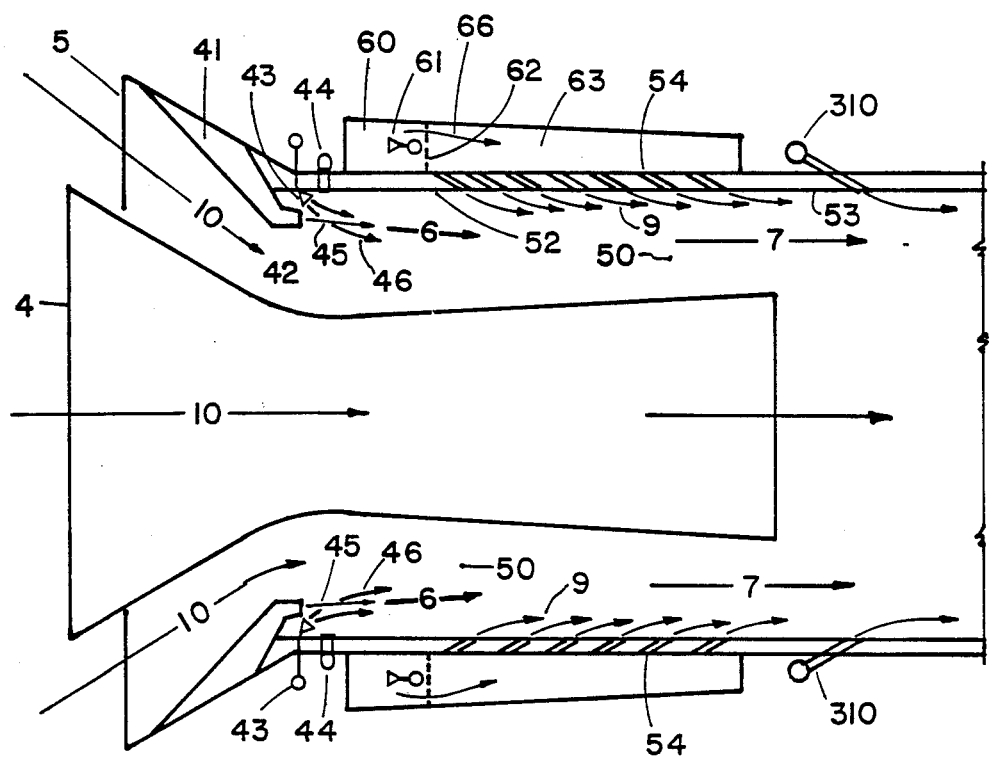
FIG. 9 is a detail of the fuel injecting ram thermal inducing nozzle showing production of the ramjet stream.

FIGS. 4, 5, 6 and 9 show the ram thermal inducing nozzles 4 and 5 consist of a convergent-divergent double throttle duct whose center throttle is a main ramflow inducing nozzle 4 and outer throttle is a fuel injecting ramflow inducing nozzle 5, both throttles converging from the bellmouth shaped air inlets located within the ram constriction-pressure plenums 3. The bellmouth air inlet of fuel injecting ramflow inducing nozzle 5 encloses a compressed air chamber 41 communicating with compressed air shooting form slot 42. The air shooting slot 42 is fitted with fuel injecting sprayers 43 and ignitors 44 which are located in the forward section of the combustion chamber 50 adjacent the throat of the fuel injecting ramflow inducing nozzle 5. FIGS. 4 and 9 show the throat upstream of the ramflow inducing nozzles 4 and 5 are convergent from the bellmouth shaped air inlets, inducing the ram thermal streams 10 to flow through the throats and expand into the diverging contour of the downstream throat 50 and 51. The main ramflow inducing nozzle 4 is slightly divergent along its length downward of the downstream throat to terminate forming an intermediate wall 51 of ignition-combustion chamber 50. The throat downstream of fuel injecting ramflow inducing nozzles 5 are divergent to ensure an adequate ignition velocity of combustion chamber 50. The activated ceramic-lined combustion chamber wall 52 functions as a flame bed 53 enclosing the vaporized gas orifices 54 communicating from the vaporized gas distributing chamber 63.

FIG. 9 shows the liquid fuel prevaporization annular chamber 60 attached on the outstream of combustion chamber 50. The prevaporization chamber 60 includes liquid fuel injecting sprayers 61, perforated baffle 62 and vaporized gas distributing chamber 63. The vaporized gas distributing chamber 63 communicates with combustion chamber 50 by the vaporized gas orifices 54. The vaporized gas orifices 54 are inclined downstream toward the exit of the thrust nozzle. Airflow within the combustion chamber flows over the inclined orifices 54 providing a negative pressure within the vaporization chambers 60 and 63.

When activated, the liquid fuel injection spray in the prevaporization chamber 60 processes fuel into vaporized gas. The vaporized gas passes through the perforated baffle 62 to equalize the distribution of gas between the prevaporization chamber 60 and the vaporized gas distribution chamber 63. The vaporized gas-air mixture layer on the flame bed 53 produces a flame stream 9 which forms a flame wrapping boundary layer of the ramjet stream 7 in the combustion chamber to insure that the high velocity ignition achieves a high velocity ramjet stream 7.

FIG. 9 shows the compressed airstream 45 intercepted by fuel injection spray 46 downstream of the compressed air shooting slot 42. Ignition at the confluence produces a primary flame stream 6 of the ramjet. The primary flame stream 6 is intercepted by a secondary flame stream 9 from flame bed 53 in the ignition-combustion chamber 50 resulting in an acceleration in the velocity of combustion and producing a ramjet stream 7.

FIG. 4 shows the downstream end inner edges 55 of the combustion chamber walls are tangentially joined with the exit nozzle 8 of the turbojet engine 105, and the outer edges 56 of the combustion chamber walls which peripherally extend to a flattened oval thrust nozzle 11 terminating with the ram thermal stream annular slot 59 connected from the ram constriction-pressure plenums 3 that functions to guide the ram thermal stream power generation by direct transfer into the aerodynamic lift-thrust generating channel.

FIG. 10 shows the ramjet streams 7 tangential interaction with the turbojet stream 8 through the turbo-ram induction jet oval thrust nozzle 11.

FIG. 9 shows the compressed air shooting through the ramjets when operated during low speed flight. The velocity pressure in the ignition-combustion chamber is greatly increased by the thermal bounding of the primary flame stream 6. The production of the ramjet thrust during low speed flight is achieved by the primary flame stream 6 heated in the prevaporization chamber 60 of the secondary flame system on the combustion chamber wall 52, with fuel injection and ignition of the vaporized gas-air mixture producing the secondary flame stream 9 on the flame bed 53 of the combustion chamber wall, functioning as a flame wrapping-thermal boundary layer of the ramjet streams 7. The ramjet streams are combined with the turbojet stream at the oval thrust nozzle 11 producing the backburning oval thrust stream 14.

Figure 3:
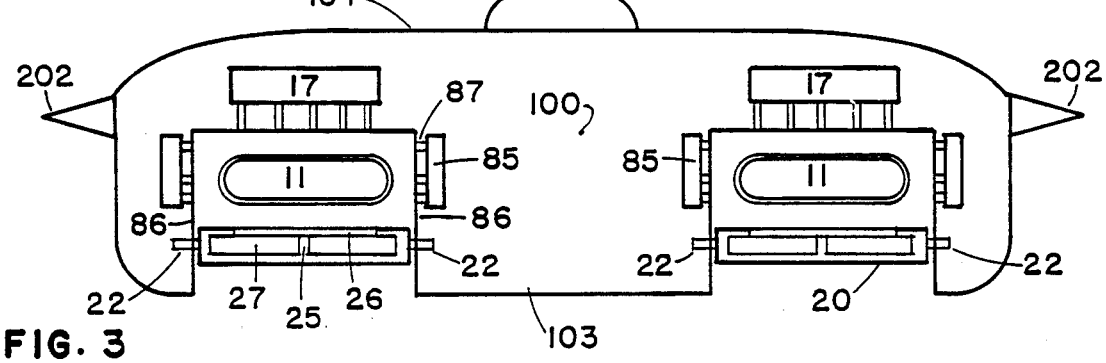
FIG. 3 is a cross sectional view of an aerothermal ultra hypersonic aircraft.

FIGS. 1, 2 and 3 show the flattened oval thrust nozzles 11 mounted at the inlet of the aerodynamic lift-thrust generating channel located above the leading edge 69 of the vacuum cell wing 20 and below the outlet of the jet thrust peripheral flow recycling duct 17. The vacuum cell wing 20 is mounted on the channel walls 86 by means of pivotal bearings 22 and the drivable bearings 23, the drivable bearings operatively engaged with actuators to control the wing deflecting incidence angle relationship with the flattened oval thrust nozzle 11 where drivable bearings modulate the wing incidence angle from minimum position 23 to maximum position 23'.

FIG. 10 shows the ram thermal stream paths in the power plants and aerodynamic heated steam paths in the perimeter of an airframe. The aerodynamic thermal generating ram constriction vane diffuser 30 generates a freestream throat 3T of the ram thermal stream in the air plenum-engine pod 3 on the front of the ramflow inducing nozzles 4 and 5. The ram thermal stream on the throat downstream of ramflow inducing nozzles 4 and 5 receives additional energy input Q and produces the ramjet streams 7 which are combined with the turbojet stream 8 in the ram-turbo induction jet oval thrust nozzle 11 then flow over the vacuum lift-thrust wing 20 in the aerodynamic generating channel.

FIG. 10 shows the aerodynamic compression heating on the shockcone of an airframe produces a ram thermal stream, some of which is passed into the hollow space 84 flowing into the aerodynamic lift-thrust generating channel through the orifices 87 on the channel walls 86. The ram thermal stream 88 on the diverging contour of the channel walls functions as a thermal bounding boundary layer between the thrust stream 15 and the channel walls 86, thereby increasing the effective thickness of the boundary layer and also aerodynamically lubricating the channel walls to reduce frictional loss due to shearing of the thrust stream against the channel walls.

FIG. 10 shows the aerodynamic compression heating on the forward wedge perimeter has a water inlet 303 at the forward nose 101 and steam outlets 304 at the ends of steam passageway 305. The aerodynamic heating zone 201 of the perimeter generates steam through a plurality of steam passageways which conduct the steam to the aerodynamic expansion cooling zone at the rearward wedge perimeter 202, condensing the steam, with the condensate flowing into the receiver tank 300 connected with the feed water pump 301 which recirculates the condensed water to generate the steam on the forward section of the airframe. FIG. 11 also shows the steam injection streams 310 and 311 for the skin temperature cooling of the ram thermal stream paths in the power plant and the aerodynamic generating channel.

FIG. 11 shows the dynamic pressure of the spreading oval thrust stream 14 which entrains the tangential airflow of the secondary airstreams. This induces the recycling jet stream 12 and the surrounding airstream 13. The recycling jet stream 12 is drived from the jet thrust peripheral stream 16, a portion of which is diverted into the forward section of the upper portion of the main generating channel through the reverse flow duct 17 system. A surrounding airstream 13 is induced into the forward section, lower portion of the main generating channel through the secondary air inducing gap.

The secondary air streams are tangentially merged with the primary air of the backburning oval thrust stream 14, to produce a flattened jet thrust stream 15 in the diverging contours of the main generating channel flow located over the vacuum cell induction lift wing 20.

The recycling of the jet stream increases the mass flow of the thermal stream and reduces the stream separation in the upper portion of the main generating channel. The recycling jet thrust peripheral stream functions as the heat-mass recovery of the induction aerodynamic system, which is like a thermal flyweel pushing against the surrounding airstream 13 to achieve a dramatic conservation of thermal energy in the main generating channel used for production of the induction aerodynamic lift-thrust forces.

An advantage of the jet recycling is that a reduction of stream separation and an increase in the thickness of the boundary layer at the ceiling portion of the main generating channel is achieved. This results in a reduction of the shear-stress and of the turbulence in the upper portion of the main generating channel. This design service to inhibit cavitation between the thrust stream 15 and the ceiling panel 19 and reduces the tendency of cold air to mix into the thrust stream in the upper portion of the main generating channel. This enhances the thermodynamic effects produced by the temperature differential which exists between the lower and the upper portion of the main generating channel.

The temperature of the flattened jet thrust stream 15 in the upper portion of main generating channel is higher than that in the lower portion thereof, the lower portion being mixed with more of the surrounding cold air in a given span of the airstream path. The lower portion mass flow density is, therefore, greater than that in the upper portion. This increases the stream dynamic pressure on the top panel of an airfoil wing and enhances the vacuum pressure generated by the flattened jet thrust stream 15 on the vacuum cell induction lift wing 20.

Figure 12:
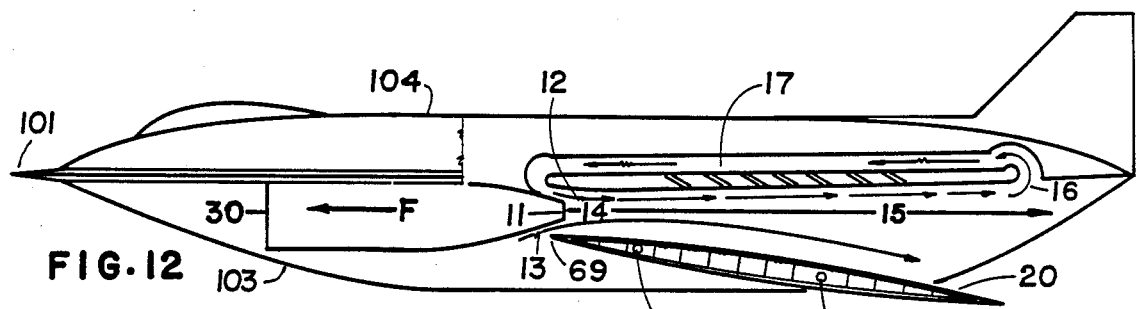
FIG. 12 is a longitudinal section view of an aircraft showing the lift force generation during low speed flight.
Figure 13:
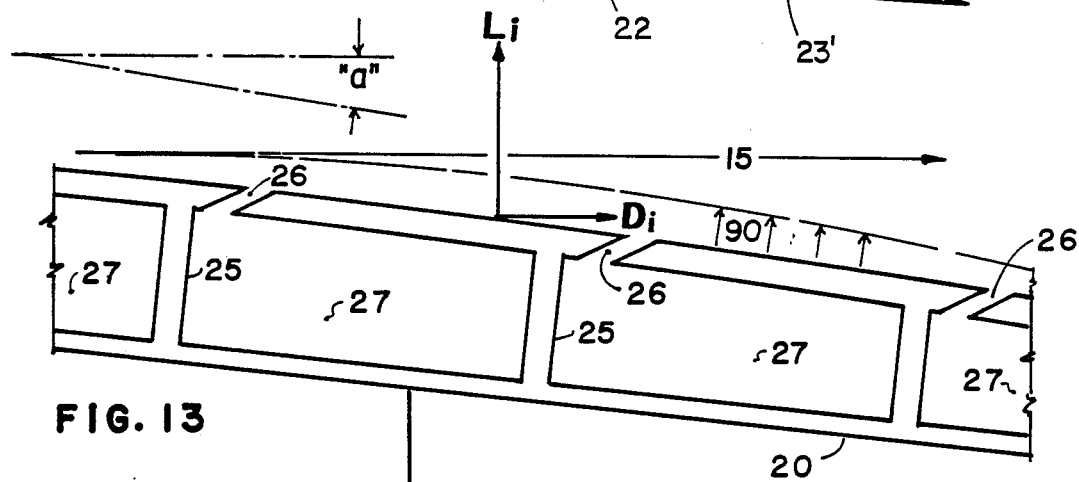
FIG. 13 is a partial sectional view of a vacuum cell wing showing the extreme incidence angle for generating the lift force during low speed flight.

FIGS. 11 and 12 show the vacuum cell induction lift wing 20 which is operatively coupled to the flattened jet thrust stream 15. The flattened jet thrust stream is substantially parallel with the top panel of the vacuum cell induction lift wing 20 and functions to generate the vacuum within the vacuum cell 27. The vacuum pressure gain in the vacuum cell 27 and resultant vector force is varied by the incidence angle "a" of the wing 20. The vacuum pressure creates or adds to the lift-thrust forces on the wing 20. The dynamic pressure of the flattened jet thrust stream 15 flows over the vacuum cell wing 20 with a variable incidence angle "a" which has a minimum and maximum incidence angle "a" relative to the flattened jet thrust stream 15. FIGS. 1 and 2 show that the wing 20 is mounted on the channel walls 86 through a fixed bearing support 22 located adjacent the leading edge 69, and a drivable bearing support 23 located adjacent the trailing edge. The drivable bearings are linked with and driven by hydraulic actuators for controlling the wing incidence angle "a". FIG. 12 shows the extreme incidence angle "a" of wing position during low speed flight. FIG. 13 shows that the wing has partitions 25 which divide a hollow interior cavity into individual cells 27. Each cell has a vacuum induction slot 26 which extends from the front face partition 25 of the cell and which is inclined rearward of wing.

FIG. 13 shows that the vacuum pressure extends to the top surface of the wing to create a vacuum field 90 over a large area of the wing top panel. This stimulates the lift force Li to be generated on the wing by the flattened jet thrust stream 15. Also, an induced drag Di is generated which fraction of the lift that is parallel to the flowfield and equals the Li tangent of the angle "a" between the wing chordline and the flattened jet thrust stream 15.

Figure 14:
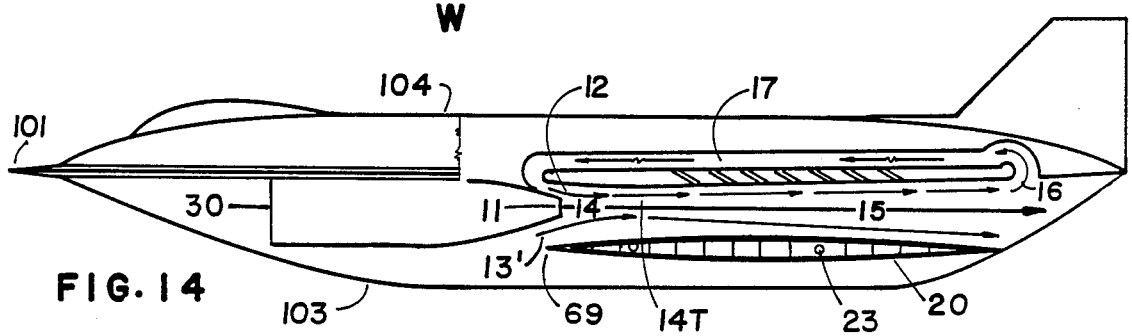
FIG. 14 is a longitudinal sectional view of an aircraft showing the thrust force generation during high speed flight.
Figure 15:
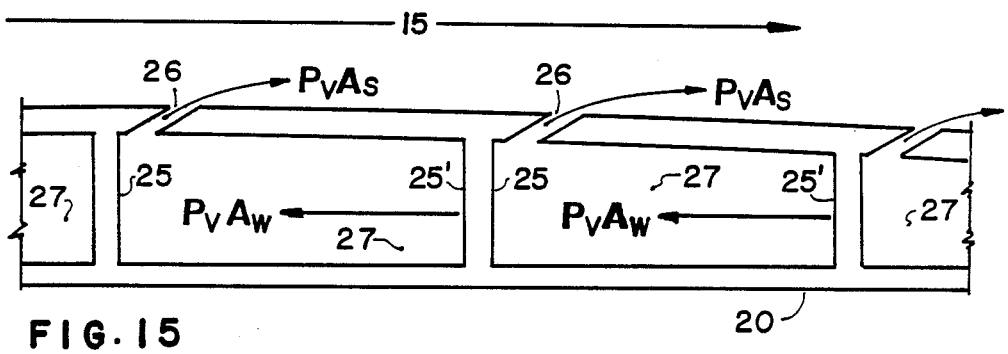
FIG. 15 is a partial sectional view of a vacuum cell wing showing the minimum incidence angle for generating the vacuum pull force during high speed flight.

FIG. 14 and 15 show the minimum incidence angle of the wing in position during high speed flight. The vacuum is formed in the individual vacuum cells 27 stimulating the vacuum through the vacuum induction slots 26.

The vacuum vector gain in the vacuum cell is on the rear portion of the vacuum induction slots which stimulates a forward driving vacuum vector directed toward the thrust stream. The forward driving vacuum force PvAw gain on the wing cell is greater than the backward driving vacuum force PvAs gain on the vacuum induction slots, the net exceeding force creating the wing vacuum pull power. The wing vacuum pull power is generated on the speeding local wing component which promotes the forward thrust and which accelerates the aircraft in response to the active vacuum in the vacuum cell wing.

The active vacuum within the vacuum cell defines a clearance gas volume. The vacuum cell induction lift wing is operated substantially without vapor in the cell, therefore, there is nearly zero leakage of clearance gas volume. The pressure of the suspended clearance gas volume is in proportion to the shearing stress of the flattened jet thrust stream. The stimulated vacuum pull power in the vacuum cell is held in pressure equilibrium by the dynamic pressure of the flattened jet thrust stream. The pressure in the vacuum cell occupied by the residual clearance gas volume maintains the up-stroke of vacuum and stimulates a nearly constant vacuum power. The high vacuum is characterized by transitions from a viscous to a molecular flow of the clearance gas volume, meaning that the molecules collide more often with the tangential lip of the vacuum induction slots 26 and walls 25 of the vacuum cells 27. The pressure force of the colliding molecules is perpendicular to the surface of the vacuum cell. The resultant vector of the vacuum is directed by the alignment of the vacuum induction slots 26 which stimulates a stretched vacuum force on the top panel of the airfoil shaped vacuum cell induction lift wing 20.

FIG. 13 shows the vacuum pressure vector which is tangent to the flattened jet thrust stream 15 due to the incidence angle "a" of wing for lift force Li generation. The pressure force is directed rearward thereby generating an induced drag Di force on the wing.

The primary force of the flattened jet thrust stream 16 induces a secondary force of the vacuum field on the vacuum cell wing. This is analogous to the principle of the primary power of the electric transformer inducing a secondary force in a magnetic field. The vector of the magnetic field is directed to its poles, and likewise, the vector of the vacuum field is nearly normal to the flattened jet thrust stream at the incidence angle of the wing.

FIG. 13 shows the normal vector which is created by the induction aerodynamic lift force Li, and the tangential component of the lift force which is created by the induced drag force Di. The lift and drag forces are generated simultaneously on the vacuum cell induction lift wing 20. The balancing of these forces occurs at the wing surface, and is a function of the velocity-density of the flattened jet thrust stream and of the incidence angle "a" of the vacuum cell induction lift wing. The induction aerodynamic lift force Li balances the gross weight W of the aircraft and the induced drag Di balances the gross thrust force F. This equilibrium of the forces enables the aircraft to achieve a hovering capacity in mid-air and the controlling of the lift-thrust forces enables the aircraft to achieve vertical take-off to ultra hypersonic flight. The variation of lift and thrust forces are introduced by the flow geometry of the flattened jet thrust stream in the aerodynamic lift-thrust generating channel. The flow geometry of the aerodynamic lift thrust generating channel is varied by the incidence angle "a" of the vacuum cell induction lift wing (the angle of the wing chord line relative to the flattened jet thrust stream).

FIG. 12 shows that the wing, when positioned at a maximum incidence angle "a', decreases the flow geometry adjacent to the leading edge 69 of the wing and increase the flow geometry adjacent to the trailing edge of wing. This means that the channel shaping action is divergent to the rear and the divergence can be varied by changing the deflection of the wing positions. The wing is positioned in the maximum incidence angle "a" for VTOL capacity generation and low speed flight.

FIG. 14 shows the wing when positioned at a minimum incidence angle with the top surface of vacuum slot wing positioned nearly parallel with the beam-line of the flattened jet thrust stream 15. The wing is operated in this position during high speed flight which means that the vacuum cell induction lift wing functions as a vacuum pull power generating wing.

FIG. 15 shows the vacuum cell induction lift wing positioned at a minimum incidence angle to form the forward pull vacuum vector generating wing. The vacuum vector is perpendicular to the internal surfaces of the vacuum cell and the magnitude of pressure is directed to vacuum induction slots 26. The direction of pressure may be varied by the geometry motion of vacuum cell which, in turn, is related to the location of vacuum induction slots. FIG. 15 shows the location of vacuum induction slots 26 positioned adjacent to the front partition 25 of the vacuum cell wing. The vacuum cell induction lift wing is converted to a kinetic vacuum power generating wing during high speed flight.

FIG. 14 shows the wing having a leading edge 69 which is positioned on the lower-inlet portion of the thrust generating channel and adjacent to the oval thrust nozzle 11. A surrounding airstream gap is formed between the flat span of the oval thrust nozzle 11 and the leading top panel of the airfoil shaped vacuum cell induction lift wing 20. The forward speeding airfoil wing generates a high velocity oblique ram-airstream 13' through the surrounding airstream gap which passes over the leading top panel of the airfoil wing 20.

The high velocity oblique ram-airstream 13' tangentially interacts with the backburning oval thrust stream 14 by constricting the stream to a critical pressure at the leading section of the thrust generating channel. This causes the high velocity momentum of the oblique ram-stream 13' to tangentially interact with the thermal energy of the backburning oval thrust stream 14. Also, the thrust stream 14 merges with the recycling airstream 12 at the forward section of the rearwardly elongated thrust generating channel. The tangential interaction develops the critical pressure at the high velocity freestream throat 14T located at the leading section of the thrust generating channel.

The basic principle of hypersonic speed generation is that the control of velocity in the thrust generating channel is achieved by the oblique ramstream 13' and the backburning oval thrust stream 14. In addition, flight speed is accelerated by the wing vacuum pull power relative to the dynamic pressure of the flatten jet thrust stream 15 flowing over the vacuum cell wing 20. The velocity of the expanding oblique ramstream 13' is faster than the free stream velocity of the flight speed, meaning that the velocity of the backburning oval thrust stream 14 is slow than the velocity of the oblique ramstream 13' during hypersonic flight.

The velocity of the airstream, before the freestream throat 14T in the forward section of the thrust generating channel, will immediately attain hypersonic velocity due to the density changes resulting from the combination of the backburning oval thrust stream 14 with the recycling airstream 12. The density changes are subjected to higher velocity activation by the oblique ram-airstream 13' and the thermal effects of the backburning oval thrust stream 14 which is enhanced by the tangential interaction of thermal and kinetic energy. Flow through hypersonic freestream throat 14T is accelerated by the tangential interaction of the thermal energy of the back-burning oval thrust stream 14 and the momentum of the oblique ram-airstream 13'. Therefore, the action of the backburning oval thrust stream 14 produces forward propulsion during low speed to supersonic flight. The action of the backburning oval thrust stream 14 is a thermal effect which interacts with the high velocity oblique ram-airstream 13' during hypersonic flight to produce an expanded hypersonic thrust stream in the diverging contour of the thrust generating channel after the freestream throat 14T which then flows over the vacuum power generating wing 20.

The wing vacuum power generation is illustrated in the FIG. 15. The individual cells 27 are fabricated by front partition 25 and a rear partition 25' within the hollow wing. The vacuum induction slot 26 extends from the front partition 25 and is inclined toward the rear on the top panel of the vacuum cell wing 20. The thrust stream flows parallel and rearward on the top panel of the vacuum cell wing and flows in a laminar manner over the vacuum induction slots 26 to induce a vacuum within the wing cell. A vacuum vector is produced on the interior surface of the wing cell with the pressure exerting a force which is directed to the vacuum induction slots 26, creating a vacuum pressure cylinder in the wing cell, which vacuum pull force is a beating force to the thrust streamward.

The forwarding vacuum pull force gain on the vacuum pressure cyclinder of the wing structure is transmitted to the airframe structure through the wing supports. This promotes the forward speed with the vacuum pull force generated on the wing.

The vector distribution of vacuum pull force in the vacuum cell wing depends on the location of vacuum induction slot on the top panel of the wing relative with the directiOn of the thrust stream. For example, if the vacuum induction slots are adjacent to the rear face of the partition 25', the pressure vector is directed toward the rear. This creates a strong drag force which is generated on the wing. On the other hand, if the vacuum induction slots 26 are located adjacent to the front face of the partition 25, as shown in FIG. 15, the resultant pressure vector is directed forward. This creates a strong forward pull force on the wing.

FIG. 15 shows the intensity of the kinetic vacuum pressure Pv is equal pressure on t he induction slot area As and in the cell area Aw. The motion geometry of the open pair vacuum link defining: (a) induction slot area As is the vacuum driver, and (b) cell area Aw is vacuum driven. The vacuum driven area Aw is much greater then that of the vacuum driver area As over the equal intensity of vacuum pressure Pv. The work rate of the driver and the driven is equal, creating of the driven force PvAw is greater than that of the driver force PvAs. The driver force PvAs is suspended by the dynamic pressure of the backward flowing thrust stream and open link pair with the forward directing vacuum vector chamber 27. The driver force PvAs is directed backward and the driven force PvAw is directed forward. Therefore, the vacuum cell wing generates its vacuum pull force during high speed flight with a minimum incidence angle of the wing relative to the thrust stream.

The vacuum cell wing generates the lift force during low speed flight at a maximum angle of the wing relative to the thrust stream by adjusting the incidence angle of the wing relative to the speed of flight. The action of the wing being converted to a vacuum pull force generating wing during high speed flight. This means that the aerodynamic lift generating channel is converted to an aerodynamic thrust generating channel.

The wing vacuum pull power is independent of the relationship between the air cushion thrust and the speed of flight. Thus, the wing vacuum pull power is generated on the speeding local wing component which further accelerates the forward speed of the aircraft.

The vacuum pull power is generated by the tangential stress of the thrust stream relative to the density and velocity of the flattened jet thrust stream. The velocity of the flattened jet thrust stream is generated by the tangential interaction of the backburning thermal energy of an oval thrust stream, the velocity momentum of an oblique ram-airstream and the thermal mass of a recycling airstream. Combination of the above three components of thermal, momentum and mass effects generate a hypersonic thrust stream in the aerodynamic thrust generating channel resulting in the ultra hypersonic aircraft.

I claim:

1. An aircraft converting aerodynamic ram thermal stream energy generated by aerodynamic compression heat-flow directly into thrust power thereby creating an aerothermal ultra hypersonic aircraft, said aerothermal ultra hypersonic aircraft comprising an airfoil shaped disk airframe, said disk airframe further comprising:
   (a) an aerodynamic compression ram thermal stream generating vane diffuser mounted on the forward face of an air plenum-engine pod, said vane diffuser defining the air inlet of a ram thermal-pressure plenum wherein said vane diffuser further comprises vertical multiple vanes; and
   (b) at least two ram thermal-pressure stream induction nozzle mounted on the rearward portion of said air plenum-engine pod, said induction nozzles defining an air outlet of the ram thermal-pressure plenum wherein said induction nozzle consists of a convergent-divergent double throttle duct, the center throttle being a main ramflow inducing nozzle and the outer throttle being a fuel injecting ram flow inducing nozzle, both nozzles convergent from a bellmouth-shaped air inlet located in the ram thermal-pressure plenums on both sides of a turbojet engine, said main throttle duct and said outer throttle duct having a main throat and an outer throat respectively, the main throat being slightly divergent along its extension and venting into a combustion chamber, and the outer throat being divergent to ensure adequate ignition velocity of the ramjet stream in an ignition-combustion chamber; and
   (c) a combustion chamber, the downstream end-inner edges of this combustion chamber being tangentially jointed with the exit nozzle of a turbojet engine and the outer edges of this combustion chamber peripherally reshaped to form an oval thrust nozzle, said oval thrust nozzle being enveloped by a ram thermal stream induction annular slot communicating from the ram thermal-pressure plenum; and
   (d) an aerodynamic compression ram thermal stream sink shockcone forming the forward section of a disk airframe, said shockcone enclosing double walled ram thermal stream spaces continuous with and extending into a hollow space located behind channel walls, said channel walls enclosing a plurality of inclined orifices, said inclined orifices directing the flow of air therethrough toward the rear of the aircraft.

2. The aerothermal ultra hypersonic aircraft of claim 1 wherein said ram thermal stream generating multiple vane diffuser consists of both fixed and deflectable vanes, the leading section of each vane formed into a shock-wedge, said shock-wedge peripherally sunk to form a thermal well bordering at the lateral edges of said shock-wedge and curving out along its extension to thermal lips, the outer edges of said thermal lips peripherally converging to a hinge joint which is adapted to the trailing section of said vane diffuser, said vane diffuser further comprising:
   (a) fixed vanes which are rigid straight vanes fitted on a vane mounting frame and positioned near a center-line of the ram thermal pressure plenum located inside the engine pod and on both sides of a turbojet engine; and
   (b) deflectable vanes having a deflectable trailing section hinged with a rigidly fixed leading section, said deflectable vanes being positioned in an equally spaced relationship in the vane mounting frame on both sides of the fixed vanes and having the trailing section thereof operatively coupled to an actuator to deflect and bend the same towards the fixed vane.

3. The aerothermal ultra hypersonic aircraft of claim 1 wherein said vanes of said aerodynamic thermal stream generating vane diffusers are ceramic lined and double walled, said double walls enclosing hollow spaces within the vanes for steam ventilation, said hollow spaces having a steam inlet at the leading vane hollow and steam outlet orifices at the trailing vane hollow which enables the passage of steam therethrough,
   said ceramic lined vanes including both a leading section and trailing section, the peripheral edge of the leading section of said vanes being shaped with a concave groove joint to mate with the forward convex shape of the trailing section of said vanes and with top and bottom ends of vane pivotals being sleeve integrated with the vane mounting frame with one end of the vane pivotal being extended and rigidly connected to vane arms and wherein the trailing section of the vanes are operatively coupled through the vane arms with linkages which are operatively coupled by link pins which are in engagement with actuators for adjusting the angle of the trailing vanes.

4. The aerothermal ultra hypersonic aircraft of claim 1 wherein said air inlet bellmouth of said fuel injecting ramflow inducing nozzle enclosing a compressed air chamber which peripherally converges to a compressed air shooting slot, the compressed air shooting slot being located in front of the combustion chamber adjacent to the throat of the fuel injecting ramflow inducing nozzle, and liquid fuel injecting sprayers and ignitors, the fuel injection vapor intercepting with the compressed air to produce a combustible mixture with ignition thereby producing a primary flame stream in the ignition chamber of the ramjet;
   a center throat downstream of the main ramflow inducing nozzle slightly divergent along its extension and venting into the combustion chambers;
   an outer throat downstream of said fuel injecting ramflow inducing nozzle, said outer throat being divergent to ensure an adequate ignition velocity of a flame stream within an ignition-combustion chamber, said ignition-combustion chamber being double walled, said double walls enclosing hollow spaces wherein said spaces comprise a liquid fuel prevaporization chamber and vaporized gas distributing chamber, said chambers located between the inner and outer double wall space having a perforated partition, said perforated partition functioning to equalize the distribution of the vaporized gas flowing by pressure differential between said chambers;

an activated ceramic-lined inner wall enclosing the vaporized gas orifices, said ceramic-lined inner wall being penetrated by vaporized gas orifices communicating from the vaporized gas distributing chamber, said vaporized gas orifices inclined towards the exit which forms the slipflow of the ramjet stream over the orifices in the combustion chamber, said activated ceramic-lined combustion chamber wall functioning as a flame bed when a vaporized gas mixture is ignited thereby generating a secondary flame stream in the combustion chamber of the ramjet, the downstream-end inner edges of said combustion chamber being tangentially joined with the exit nozzle of a turbojet engine and the outer edges of said combustion chamber being peripherally extended and reshaped to an oval thrust nozzle terminated with the ram thermal stream induction annular slot communicating with the ram thermal stream constriction-pressure plenums.

* * * * *